United States Patent [19]

Luckanuck

[11] Patent Number: 4,489,121
[45] Date of Patent: Dec. 18, 1984

[54] FIRE-RESISTANT SANDWICH CORE ASSEMBLY

[76] Inventor: John S. Luckanuck, Box 158, Cambridge, Ontario, Canada, N1R 5S9

[21] Appl. No.: 480,120

[22] Filed: Mar. 29, 1983

[51] Int. Cl.³ .............................................. E04B 1/94
[52] U.S. Cl. ..................................... 428/192; 52/232; 52/457; 428/326; 428/920
[58] Field of Search ........................................ 428/284, 428/192, 210, 241, 325, 326, 920; 52/232, 457

[56] References Cited

U.S. PATENT DOCUMENTS

| | | | |
|---|---|---|---|
| 3,259,536 | 7/1966 | Gaeth et al. | 428/284 X |
| 3,916,059 | 10/1975 | Molloy et al. | 428/326 X |
| 3,928,097 | 12/1975 | Sauder et al. | 156/250 X |
| 3,994,110 | 11/1976 | Ropella | 428/920 X |
| 4,086,737 | 5/1978 | Byrd, Jr. | 428/920 X |
| 4,236,365 | 12/1980 | Wheeler | 428/326 X |
| 4,258,017 | 3/1981 | Gelfand | 55/72 X |
| 4,282,687 | 8/1981 | Teleskivi | 428/920 X |
| 4,343,127 | 8/1982 | Greve et al. | 428/920 X |
| 4,366,202 | 12/1982 | Borovsky | 428/284 X |

Primary Examiner—Henry F. Epstein
Attorney, Agent, or Firm—Holman & Stern

[57] ABSTRACT

A fire-resistant sandwich core assembly, particularly for a fire door, comprises a central core layer. A protective layer of ceramic fibre board is provided on each of the main faces of the core layer to form a fire-resistant assembly. Stiles, rails, and appropriate facing may be applied to the assembly to provide a finished fire door.

19 Claims, 4 Drawing Figures

FIRE-RESISTANT SANDWICH CORE ASSEMBLY

BACKGROUND OF THE INVENTION

1. Field of the Invention

This invention relates to a fire-resistant sandwich core assembly, particularly for use in fire doors.

2. Description of the Prior Art

Fire doors are employed in buildings to prevent fire propagation along corridors in the event of a fire. Fixed structures, such as the internal walls of the building, can more easily be made fire-resistant by using gypsum-based materials. A fire door however presents a problem. In the prior art, the interior of the door was filled with a mixture of perlite and gypsum to give the door the necessary fire-resistant properties. This made the door heavy and very difficult to attach to the hinges. If enough wood was provided around the periphery of the door to allow attachment to the hinges, the performance of the door would deteriorate to the point where it would not withstand a fire for the required amount of time to meet generally accepted test criteria. Also, a door having a core of gypsum and perlite is difficult to mass-produce. The perlite-gypsum mixture has to be poured into a mold, allowed to set, and then removed and fitted into an appropriate frame. Another problem with such doors has been the tendency to delaminate as a result of constant opening and closing.

BRIEF SUMMARY OF THE INVENTION

According to the present invention there is provided a fire-resistant panel assembly comprising: a core of high density particle board having a pair of major faces; a protective sheet of rigid, high temperature fibre board made from bulk ceramic fibres having an alumina and silica base provided on each of the major faces of the core; and a facing sheet provided on the outer surface of each of said protective sheets.

In a preferred embodiment, a Masonite frame borders the central core to provide good screw-holding properties. The panel assembly may be made up into a complete door by providing wooden stiles and rails. The panel assembly can however be used in other applications where a self contained fire-resistant panel is required.

In a preferred embodiment, a Masonite frame is bonded to the edges of the central core layer between the ceramic fibre boards. Stiles and rails are then bonded to the edges of the door.

BRIEF DESCRIPTION OF THE DRAWINGS

The invention will now be described, in more detail, by way of example only, with reference to the accompanying drawings, in which.

DETAILED DESCRIPTION OF THE PREFERRED EMBODIMENTS

Figure 1:
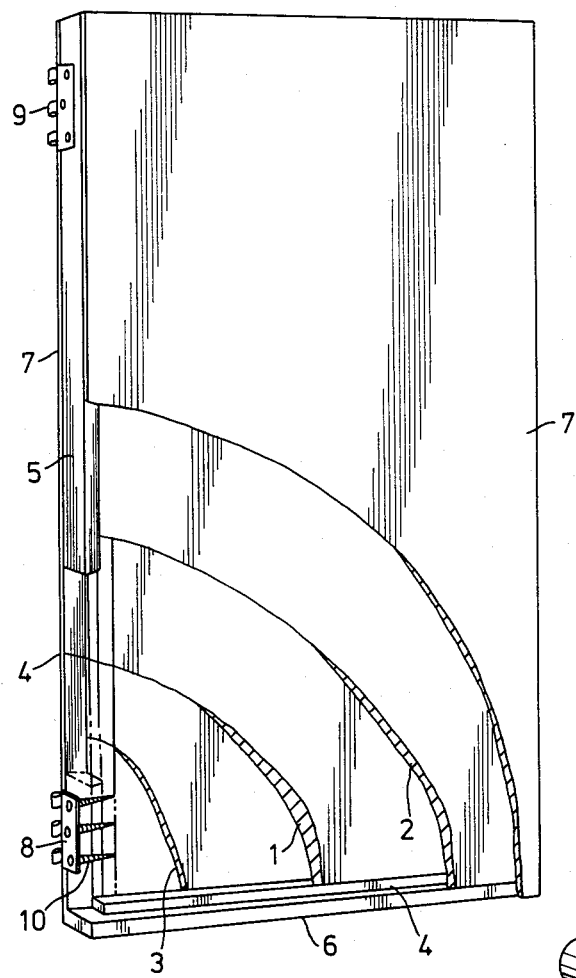
FIG. 1 is a perspective partly cut away view of a fire door according to one embodiment of the invention.

The fire door shown in FIG. 1, comprises a central core 1 of one inch thick high density particle board. A suitable particle board would, for example, be a solid particle board of 28 lbs. density made from softwood lumber chips bonded with urea resin adhesive. Onto each major face of the core 1 is glued a protective sheet 2, 3 of ¼ inch ceramic fibre board. Suitable adhesives for this purpose are, for example, Bordens 906 and National Cassine 8580. The ceramic fibre board is suitably Fibrefrax Duraboard (a trade mark of the Carborandum Resistance Materials Co., (LD)). This fibre board is a rigid, high temperature board made from bulk ceramic fibres and organic bonding agents. It offers low thermal conductivity, high temperature stability and excellent resistance to thermal shock and chemical attack. The ceramic base is of alumina and silica.

Bars 4, having an approximately square section, of rectangular Masonite are glued to each of the four edges of the core layer 1 so as to form a closed frame extending completely around the core. The protective sheets of ceramic fibre board 2, 3 extend over and are glued to the Masonite bars 4. To the outside of the vertical bars 4 are glued ½ inch thick birch or oak stiles 5, of which only the stile on the hinge side is visible in FIG. 1, and similar rails 6 are glued to the outside of the horizontal Masonite bars, of which only the bottom rail 6 is visible in FIG. 1. Plywood facings 7 are glued onto the outer side of the ceramic fibre board protective sheets 2 and 3 so as to extend also over the edges of the stiles 5 and rails 6. Various veneers of plastic or other suitable finishing materials can of course be employed instead.

If desired, an edging strip of ceramic fibre board, similar to the layers 2 and 3 can be applied to the outside edge of the Masonite inside the stiles 5 and rails 6. In this arrangement the core of the door, comprising the central core layer with Masonite surrounding it, is completely enclosed within protective layers of ceramic fibre board.

The door is hung in a suitable frame by means of hinges 8 and 9. As shown in FIG. 1, the screws pass through the birch stile 5 and penetrate the compacted Masonite bar 4, which has a high density and extremely good screw-holding properties. If the optional outer edging layer of ceramic fibre board is employed between the bar 4 and stile 5, the screws 10 can still pass through the edging strip of fibre board to become firmly anchored in the Masonite bar 4.

The described fire door has the advantage of light weight construction. It has a 1½ hour fire rating and is capable of withstanding a water test at 300 lbs/square inch. The screw-holding ability is extremly good, which makes the door convenient to install. The door does not have a high tendency to delaminate as a result of constant opening and closing. In addition, the wood stiles and rails allow the door to be trimmed for planing without effecting the screw-holding power, since the screws can still engage firmly in the Masonite frame. Also, as a result of the presence of the particle board core, locks and closers, as well as other fittings, can easily be fitted to the door. Since a mineral core is not employed, as is the case in the prior art, the risk of breakage during handling is substantially reduced.

Figure 2:
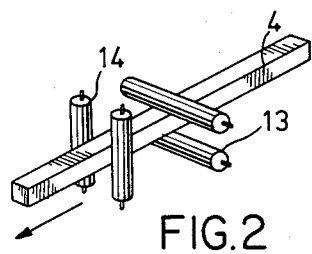
FIG. 2 shows an arrangement for applying glue to the Masonite framing bars.
Figure 3:
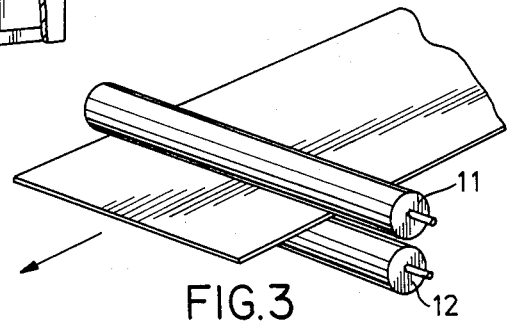
FIG. 3 shows an arrangement for applying glue to a ceramic fibre board sheet.
Figure 4:
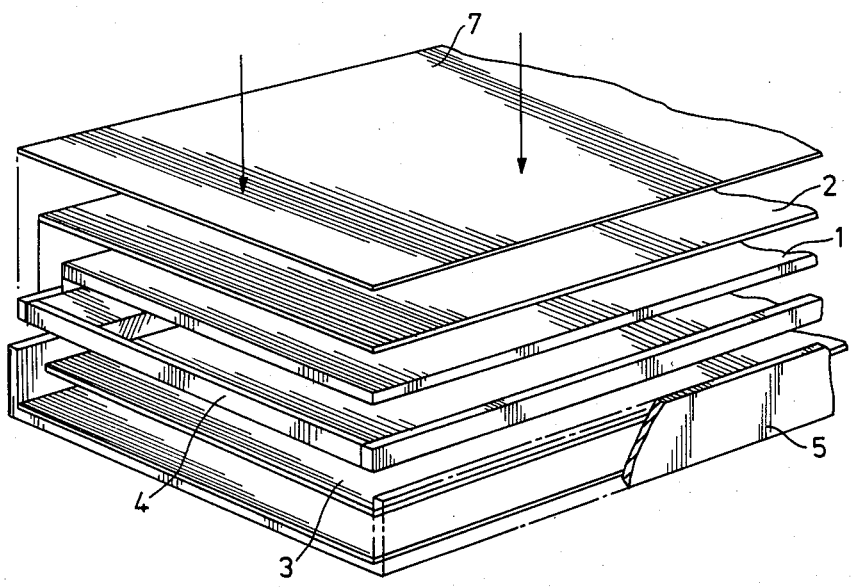
FIG. 4 illustrates the assembly of the fire door.

The fire door is also cheaper and simpler to manufacture than prior art doors. The core 1 and protective sheets 2 and 3 are coated with adhesive by passing them between coating rollers 11 and 12, schematically illustrated in FIG. 3. The Masonite bars 4 are similarly coated on all four sides by passing between pairs of rolles 13 and 14 as schematically illustrated in FIG. 2. The stiles and rails, 5, 6, are similarly coated on one side, as are the facing panels 7. The various components are then aligned and assembled in a jig as schematically illustrated in FIG. 4. To finish the door, the assembly is placed in either a hot or cold press. After pressing, the door is ready for use. This method of manufacture is much cheaper and more convenient than the prior art method of allowing a mineral core to set in a mold, and subsequently fitting it into a frame to form the finished door.

The stiles and rails, 5 and 6, which are preferably birch and oak, may be treated to be fire resistant by soaking in brine prior to assembly.

The sandwich core assembly of the fire door can if desired be used in other applications where a removable light weight fire-resistant panel is required, particularly where it is desired to have the facility to attach external fittings to the panel by means of screws.

The Masonite framing bars 4 can, if desired, be disposed of so that the screws penetrate directly the central core layer 1.

I claim:

1. A fire-resistant panel assembly comprising: a core of high density particle board having a pair of major faces; a protective sheet of rigid, high temperature fibre board made from bulk ceramic fibres having an alumina and silica base provided on each of the major faces of the core; and a facing sheet provided on the outer surface of each of said protective sheets.

2. A panel assembly as claimed in claim 1 wherein each protective sheet is glued to the associated major face of the core.

3. A panel assembly as claimed in claim 1 wherein the protective sheets are substantially thinner than said core.

4. A panel assembly as claimed in claim 3 wherein the protective sheets have approximately ¼ the thickness of said core.

5. A panel assembly as claimed in claim 4 wherein the protective sheets have a thickness of approximately ¼ inches and said core has a thickness of approximately 1 inch.

6. A panel assembly as claimed in claim 1 wherein a bar of material having a higher density than said core and with good screw-holding properties is located along each edge of said core between the protective sheets of fibre board.

7. A panel assembly as claimed in claim 6 wherein the material forming said bar is Masonite.

8. A panel assembly as claimed in claim 7 wherein a protective edging strip of rigid, high temperature fibre board made of bulk ceramic fibres with an alumina and silica base extends around the outside edge of each said bar of Masonite.

9. A fire door comprising: a core of high density particle board having a pair of major faces; a protective sheet of rigid, high temperature, fibre board made from bulk ceramic fibres having an alumina and silica base provided on each of the major faces of the core; a facing sheet provided on the outer surface of each of said protective sheets of ceramic fibre board; and rails and stiles provided respectively along horizontal and vertical edges of the core between said facing sheets.

10. A door as claimed in claim 9 wherein each protective sheet is glued to the associated major face of the core.

11. A door as claimed in claim 10 wherein the protective sheets are substantially thinner than said core.

12. A door as claimed in claim 11 wherein the protective sheets have approximately ¼ the thickness of said core.

13. A door as claimed in claim 12 wherein said protective sheets have a thickness of approximately ¼ inches and said core has a thickness of approximately 1 inch.

14. A door as claimed in claim 9 wherein a bar of material having a higher density than the core and with good screw-holding properties is provided on each outer edge of the core between said protective sheets, and said rails and stiles are provided outside said bars.

15. A door as claimed in claim 14 wherein the material forming said bars is Masonite.

16. A door as claimed in claim 14 wherein a protective edging strip of rigid, high temperature fibre board made of bulk ceramic fibres having an alumina and silica base extends around the outside edge of each said bar of Masonite between said bar and the stile or rail provided thereon.

17. A door as claimed in claim 9 wherein the stiles and rails are made of wood treated to be fire resistant.

18. A door as claimed in claim 17 wherein the stiles and rails are treated by soaking in brine.

19. A door as claimed in claim 17 wherein the stiles and rails are made of birch.

* * * * *

UNITED STATES PATENT AND TRADEMARK OFFICE
CERTIFICATE OF CORRECTION

PATENT NO. : 4,489,121
DATED : December 18, 1984
INVENTOR(S) : John S. Luckanuck It is certified that error appears in the above—identified patent and that said Letters Patent is hereby corrected as shown below:

On the title page add:

--[30] Foreign Application Priority Data
           January 13, 1983 [CN] Canada..........419,425--

Signed and Sealed this

Thirtieth Day of April 1985

[SEAL]

Attest:

DONALD J. QUIGG

Attesting Officer      Acting Commissioner of Patents and Trademarks